United States Patent [19]

Perraudin

[11] 3,845,310

[45] Oct. 29, 1974

[54] SAFETY SYSTEM FOR TARGET IRRADIATING DEVICE

[75] Inventor: Claude Perraudin, Paris, France

[73] Assignee: Thomson-CSF, Paris, France

[22] Filed: Apr. 5, 1972

[21] Appl. No.: 241,117

[30] Foreign Application Priority Data
Apr. 13, 1971 France .............................. 71.13519

[52] U.S. Cl. ................................ 250/385, 250/388
[51] Int. Cl. .............................................. G01t 1/18
[58] Field of Search ... 250/83.6 R, 49.5 PE, 49.5 R, 250/41.9 D

[56] References Cited
UNITED STATES PATENTS
2,894,142  7/1959  Oppelt ........................... 250/83.6 R
3,229,087  1/1966  Shapiro ......................... 250/49.5 PE
3,254,220  5/1966  Madey ........................... 250/83.6 R Primary Examiner—Archie R. Borchelt
Attorney, Agent, or Firm—Cushman, Darby & Cushman

[57] ABSTRACT

A safety system for switching off an irradiation system when the desired irradiation dose has been exceeded, comprises two ionisation chambers through which a particle beam issued from the radiation source propagates, each chamber supplying a radiation monitor. Those monitors supply two parallel connected comparators which operate contact breakers connected in series in a safety circuit controlling the irradiation system.

5 Claims, 1 Drawing Figure

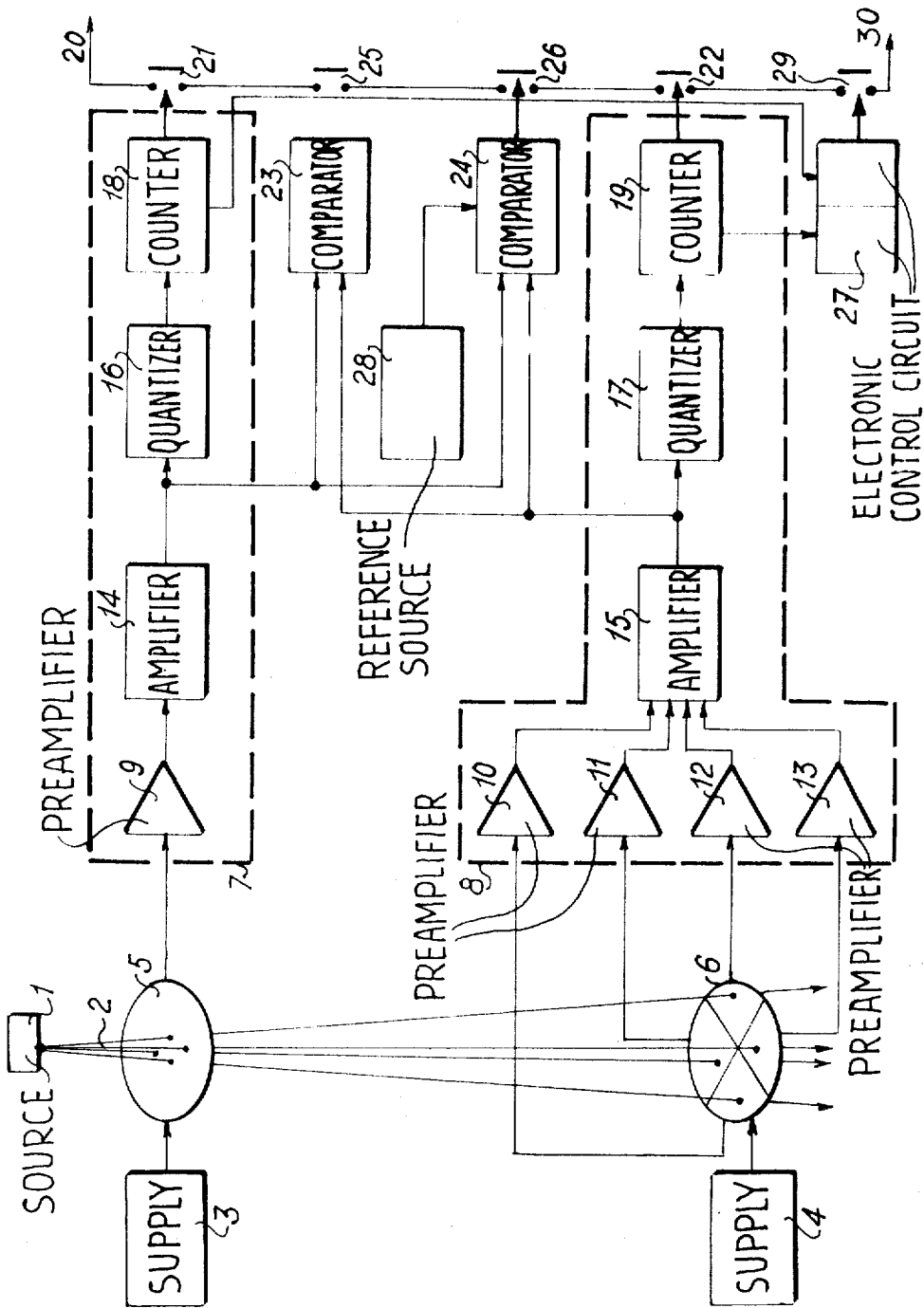

SAFETY SYSTEM FOR TARGET IRRADIATING DEVICE

The present invention relates to improvements in safety systems and in particular to those associated with irradiation devices. It is an object of the invention to prevent that the quantity or dose of radiation irradiating, for example, an organic material should not exceed the desired level.

According to the invention, there is provided a safety system for preventing the irradiation of a target by a particle beam from rising above a predetermined level, said system comprising: two ionization chambers positioned on the propagation path of said beam, for providing signals proportional to the radiation propagating therethrough, said chambers having respective outputs; two monitoring systems respectively connected to said outputs, each monitoring system comprising means for measuring the output signal applied thereto from one of said chambers; and means for switching off said beam upon one of said signals exceeding a value corresponding to said predetermined radiation level.

For a better understanding of the invention and to show how the same may be carried into effect reference will be made to the drawing, given solely by way of example, which accompanies the following description and the sole figure of which is a block diagram of system in accordance with the invention.

In this figure, a radiation source 1 supplies a beam 2 of particles. This source is, for example, an X-ray generator or a linear particle accelerator. In the case of the accelerator, the latter is associated with a microwave modulator circuit and thus produces pulsed radiation.

On the trajectory of the beam issued from the source 1, there are two independent radiation detectors each comprising a ionisation chamber 5 or 6 with its associated supply 3 or 4. The chamber 5 comprises a single electrode, while the chamber 6 has its electrode divided into four sectors and thus performs the additional function of centering the beam.

The output of the chamber 5 is connected to the input of the radiation monitor 7 and outputs of the chamber 6 is connected to the inputs of the monitor 8. Except for the input, monitors are identical and comprise a radiation measuring system. The monitor 7 comprises a preamplifier 9 and the monitor 8 comprises four preamplifiers 10 to 13. These preamplifiers are conventional preamplifier-integrators and produce a d.c. voltage whose amplitude is proportional to the detected radiation dose. The output of the preamplifier fed to amplifiers 14 or 15 which provide a predetermined voltage levels for predetermined radiation values, for example n volts for m rads.

The output of amplifiers 14 and 15 are respectively fed to quantizers 16 and 17 which provide a quantified measure of the integrated radiation dose.

The quantizers 16 and 17 are respectively connected to electro-mechanical counters 18 and 19. The rad or the roentgen can be used as the counting unit.

The electro-mechanical counters 18 or 19, which in accordance with another advantageous aspect of the invention, retain the indication of the measured dose in the event of stoppage control respectively contact breakers 21 or 22 in the safety circuit which stops the irradiation operation and which will be described hereinafter.

The signals produced by amplifiers 14 and 15 supply electronic comparator circuits, 23 and 24 which control respectively associated contact breakers 25 or 26 of the safety circuit. A dual electronic circuit 27 checks the effectiveness of the operation of the counters 18 and 19 upon actuation thereof by quantizers 16 and 17 respectively.

The comparator 23, which comprises, for example, a differential amplifier, supplies a signal proportional to the difference between the signals produced by the two monitors 7 and 8. When this difference reaches a predetermined value, the output signal from the comparator operates the associated contact breaker 25.

The comparator 24 comprises, for example, two differential amplifiers having each one input connected to one of the monitors 7 and 8 and the other input connected to a common reference source 28 producing an adjustable reference voltage which corresponds to the desired dose. The outputs of the amplifiers are connected together and the resultant signal, if it differs by a predetermined value from the reference voltage, operates the corresponding contact breaker 26.

A dual circuit 27 checks that each counter 18 and 19 has been actuated by the control pulses from quantifiers 16 and 17. For this purpose, an electronic device produces a voltage which rises continuously with time and which, if not periodically returned to zero by the control current from the counters 18 and 19, triggers the operation of a contact breaker 29.

The safety circuit hereinbefore referred to, controls the operation of the radiation system and comprises an electrical circuit which, between the terminals 20, 30, contains the above five contact breakers 21, 22, 25, 26 and 29, connected in series. The opening of any of these contacts breakers thus breaks the circuit and stops the irradiation device.

It should be pointed out that the five signals controlling the contact breakers can be used with a view to triggering, prior to the operation of the safety system, an optical and/or acoustic system indicating dangerous operation.

Of course, the invention is not limited to the embodiments described and shown which were given solely by way of example.

What I claim is:

1. A safety system for preventing the irradiation of a target by a particle beam from rising above a predetermined reference level, said system comprising: two ionization chambers positioned on the propagation path of said beam, for providing signals proportional to the instantaneous radiation propagation therethrough, said chambers having respective outputs; two monitoring systems respectively connected to said outputs, each monitoring system comprising means for measuring the output signal applied thereto from one of said chambers; and means for switching off said beam upon one of said signals exceeding a value corresponding to said predetermined reference radiation level.

2. A system as claimed in claim 1, wherein said means for switching off said beam comprises means for comparing the respective output signals of said monitoring systems to a predetermined signal level and further means controlled by said comparing means for switching off said beam upon the difference between said output signals of said monitoring systems exceeding a predetermined value.

3. A system as claimed in claim 2, wherein each of said monitoring systems comprises a series amplifier and integrator means, quantizing means and counting means.

4. A system as claimed in claim 3, wherein said means respectively controlled by said monitoring systems and said means controlled by said comparing system are all connected in series circuit.

5. A system as claimed in claim 4, further comprising means for checking the operation of said counting means, and further switching off means, controlled by said checking means and connected in series in said series circuit.

* * * * *